J. L. WENTZ.
CONVEYING BELT.
APPLICATION FILED MAR. 25, 1922.

1,432,002.

Patented Oct. 17, 1922.

Jere L. Wentz
INVENTOR

BY his ATTORNEY

Patented Oct. 17, 1922.

1,432,002

UNITED STATES PATENT OFFICE.

JERE L. WENTZ, OF PASSAIC, NEW JERSEY, ASSIGNOR TO PORTABLE MACHINERY CO., INC., OF PASSAIC, NEW JERSEY.

CONVEYING BELT.

Application filed March 25, 1922. Serial No. 546,673.

*To all whom it may concern:*

Be it known that I, JERE L. WENTZ, a citizen of the United States, residing at Passaic, in the county of Passaic and State of New Jersey, have invented certain new and useful Improvements in Conveying Belts, of which the following is a specification.

My invention relates generally to an improved flexible conveying belt, and refers more specifically to a novel form of carrying flight attachable to such belts.

The general purpose of a carrying flight is to prevent material which is being conveyed by a belt from falling or rolling off the latter, particularly when the belt is traveling at an incline. It is desirable that the flight be as high as possible so that a maximum quantity of material may be carried during operation, but if a rigid flight be employed and the upstanding part thereof be relatively high there is danger of the flight being torn from the belt in case the upstanding flight encounters an obstruction in its path of travel. It is furthermore desirable that the flight present a firm support for the material being conveyed, and that while being yieldable when coming into contact with an obstruction, the flight be capable of secure attachment to the conveying belt. A further desirable feature is that the portion of the flight secured to the belt be as narrow as possible so that no material will lodge thereunder as it passes around the pulleys over which conveying belts travel.

The principal object of my invention is to provide a novel form of flight, of simple construction, which will embody the several desirable features above referred to, and I accomplish this object by constructing the flight of both rigid and flexible material in a manner to utilize both to the best advantage.

Figure 1:
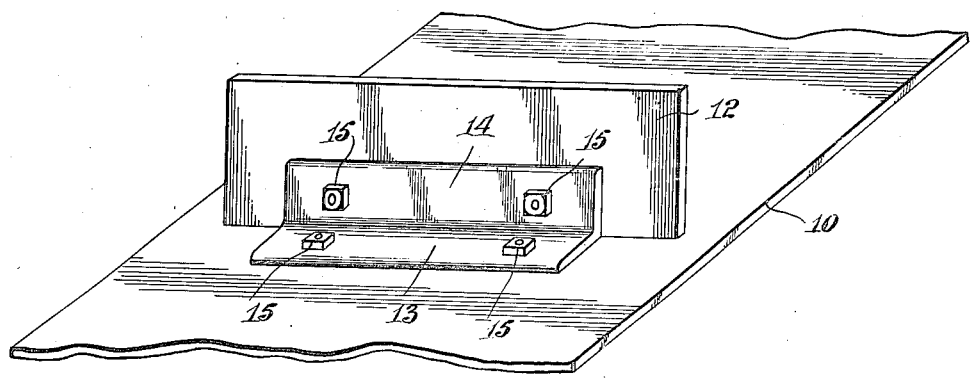
Figure 2:
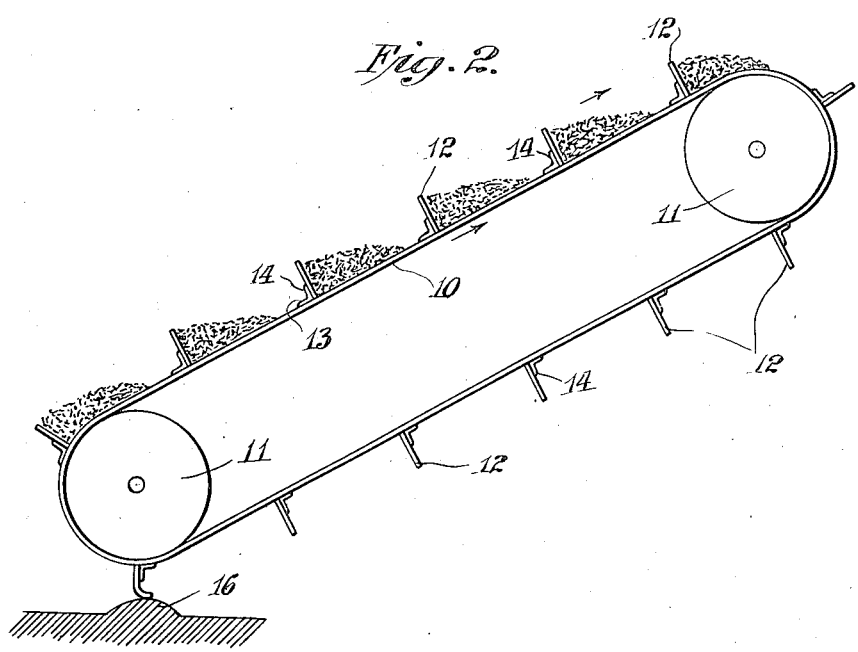

One preferred embodiment of the invention is illustrated in the accompanying drawing, in which Fig. 1 is a perspective view of a fragment of conveying belt with one of the novel flights secured thereon, and Fig. 2 is a side elevational view of a complete belt as it appears in operation.

Referring to the drawing, 10 denotes an endless conveying belt which is preferably composed of duck and rubber, and travels over the pulleys or idlers 11. The mechanism for moving the belt is not shown as it forms no part of the present invention.

Extending transversely of the belt 10 is a series of flights 12 of flexible material, preferably of the same material as that of which the belt is constructed. Any suitable number of flights may be employed, and they may be spaced and relatively arranged to suit the character of work for which the belt is intended. Each flight is secured to the belt by means of a rigid angular anchoring member, preferably an angle iron comprising the flanges 13 and 14. The flange 13 is secured to the belt 10 by any appropriate means, such as the bolt and nut fastenings 15, and the flight 12 is secured to the flange 14 by similar fastenings 15. It will be observed that in the construction illustrated the flexible flight 12 is substantially wider and higher than the flange 14, although it is to be understood that the relative dimensions of these parts may vary with the needs of the particular installation of which the belt forms a part.

It is assumed, in the showing of Fig. 2, that the belt is carrying material upwardly, and that there is an unyielding obstruction 16 in the path of the flights. Such obstructions are frequently encountered in practical operation and have heretofore been a source of serious danger to the life of the flights and consequently to the belt as a whole. With my construction, when a flight comes into contact with the obstruction 16, the flexible member 12 yields whereby all danger to the flight is obviated, and when the obstruction is passed the member 12 resumes its initial operative position, owing to its inherent flexibility.

The flight construction described is very economical both in first cost and upkeep, inasmuch as the members 12 may consist of scraps of belt material which would otherwise be wasted and because if a flight is to be replaced it is only the member 12 and not the angle iron which need be renewed.

I claim:—

1. The combination with a conveying belt, of a flexible flight carried thereon substantially at right angles to the face of the belt, and a rigid anchoring member having a portion thereof parallel to and secured to the flight and another portion parallel to and attached to the belt.

2. The combination with a conveying belt, of an angle iron having one flange secured to the belt and its other flange upstanding from the belt, and a flexible carrying flight secured to the upstanding flange of the angle iron.

3. The combination with a conveying belt, of an angle iron of less width than the belt having one flange secured to the belt and its other flange upstanding from the belt, and a flexible carrying flight of substantially greater width than the angle iron secured to the upstanding flange and extending transversely of the face of the belt.

In testimony whereof I have affixed my signature.

JERE L. WENTZ.